US010370530B2

(12) United States Patent
Boydston et al.

(10) Patent No.: US 10,370,530 B2
(45) Date of Patent: Aug. 6, 2019

(54) METHODS FOR SOLID FREEFORM FABRICATION

(71) Applicants: Andrew J. Boydston, Seattle, WA (US); Adam Edward Goetz, Seattle, WA (US); Chang-Uk Lee, Seattle, WA (US); Gregory Isaac Peterson, Tacoma, WA (US); Mark A. Ganter, Edmonds, WA (US); Duane W. Storti, Seattle, WA (US); Mete Yurtoglu, Seattle, WA (US)

(72) Inventors: Andrew J. Boydston, Seattle, WA (US); Adam Edward Goetz, Seattle, WA (US); Chang-Uk Lee, Seattle, WA (US); Gregory Isaac Peterson, Tacoma, WA (US); Mark A. Ganter, Edmonds, WA (US); Duane W. Storti, Seattle, WA (US); Mete Yurtoglu, Seattle, WA (US)

(73) Assignees: Ricoh Company, Ltd., Tokyo (JP); University of Washington, Seattle, WA (US)

( * ) Notice: Subject to any disclaimer, the term of this patent is extended or adjusted under 35 U.S.C. 154(b) by 376 days.

(21) Appl. No.: 15/054,500

(22) Filed: Feb. 26, 2016

(65) Prior Publication Data

US 2017/0246805 A1    Aug. 31, 2017

(51) Int. Cl.
*B29C 67/00* (2017.01)
*C08L 61/16* (2006.01)
(Continued)

(52) U.S. Cl.
CPC ............ *C08L 61/16* (2013.01); *B29C 64/165* (2017.08); *C08L 71/00* (2013.01); *B29C 35/0805* (2013.01);
(Continued)

(58) Field of Classification Search
CPC ............ C08L 61/16; B29K 2995/0077; B29K 2079/08; B29K 2071/00; B33Y 70/00;
(Continued)

(56) References Cited

U.S. PATENT DOCUMENTS 6,265,492 B1    7/2001  Lahijani
2009/0295042 A1*  12/2009  Pfister .................. C08J 3/28
                                                      264/497

(Continued)

FOREIGN PATENT DOCUMENTS

CN    101679646    3/2010
CN    102356128    2/2012
(Continued)

OTHER PUBLICATIONS

Extended European Search Report for EP Application No. 17155906.5, dated Jul. 12, 2017, 9 pages.

*Primary Examiner* — Nahida Sultana
(74) *Attorney, Agent, or Firm* — Patent Law Works LLP

(57) ABSTRACT

The present invention provides high performance polymer (HPP) compositions, methods, processes, and systems for the manufacture of three-dimensional articles made of polymers using molding or 3D printing. The HPP compositions comprise a first HPP dissolved in a solvent and a second HPP present as a solid.

15 Claims, 3 Drawing Sheets

(51) Int. Cl.
  *B29C 64/165* (2017.01)
  *C08L 71/00* (2006.01)
  *B33Y 10/00* (2015.01)
  *B33Y 70/00* (2015.01)
  *B29C 35/08* (2006.01)
  *B29K 71/00* (2006.01)
  *B29K 79/00* (2006.01)

(52) U.S. Cl.
  CPC .. *B29C 2035/0827* (2013.01); *B29K 2071/00* (2013.01); *B29K 2079/08* (2013.01); *B29K 2995/0077* (2013.01); *B33Y 10/00* (2014.12); *B33Y 70/00* (2014.12); *C08G 2650/40* (2013.01)

(58) Field of Classification Search
  CPC ............ B33Y 10/00; B29C 2035/0827; B29C 35/0805
  See application file for complete search history.

(56) References Cited

U.S. PATENT DOCUMENTS

| | | | | |
|---|---|---|---|---|
| 2010/0291176 | A1* | 11/2010 | Chian | A61L 27/38 424/423 |
| 2013/0052897 | A1 | 2/2013 | Rogers | |
| 2014/0134335 | A1* | 5/2014 | Pridoehl | B29C 67/0055 427/256 |
| 2015/0061195 | A1* | 3/2015 | DeFelice | B29C 64/386 264/497 |
| 2015/0069649 | A1 | 3/2015 | Bai et al. | |
| 2016/0082662 | A1* | 3/2016 | Majer | B29C 64/386 264/409 |
| 2016/0108229 | A1* | 4/2016 | Decraemer | C08G 61/127 524/540 |
| 2016/0122527 | A1* | 5/2016 | Decraemer | B29B 13/021 524/540 |
| 2016/0325491 | A1* | 11/2016 | Sweeney | B33Y 70/00 |
| 2017/0096576 | A1* | 4/2017 | Bheda | G03G 15/224 |
| 2017/0113411 | A1* | 4/2017 | Watanabe | B33Y 10/00 |
| 2017/0239889 | A1* | 8/2017 | Ganapathiappan | B33Y 70/00 |
| 2017/0312938 | A1* | 11/2017 | Brule | B29B 7/005 |
| 2017/0313050 | A1* | 11/2017 | DeFelice | B33Y 10/00 |
| 2017/0326790 | A1* | 11/2017 | Lee | B33Y 70/00 |
| 2018/0001520 | A1* | 1/2018 | Saito | B29C 39/02 |
| 2018/0022043 | A1* | 1/2018 | Keoshkerian | B33Y 10/00 |
| 2018/0029293 | A1* | 2/2018 | Neibecker | B29C 64/153 |
| 2018/0200959 | A1* | 7/2018 | Medeiros Araujo | B29C 64/386 |
| 2018/0243982 | A1* | 8/2018 | Shanjani | B29C 64/393 |
| 2018/0258559 | A1* | 9/2018 | Dadmun | D01F 6/56 |
| 2018/0264688 | A1* | 9/2018 | Jaker | B33Y 30/00 |
| 2018/0273707 | A1* | 9/2018 | Price | C08J 3/124 |
| 2018/0281276 | A1* | 10/2018 | Milroy | C08L 83/04 |
| 2018/0297270 | A1* | 10/2018 | Liu | B33Y 80/00 |
| 2018/0303643 | A1* | 10/2018 | Mitchell | A61F 2/915 |
| 2018/0319085 | A1* | 11/2018 | Dasappa | B29C 64/386 |
| 2018/0326627 | A1* | 11/2018 | Ichiki | B32B 5/08 |

FOREIGN PATENT DOCUMENTS

| | | |
|---|---|---|
| CN | 103764393 | 4/2014 |
| EP | 2565232 A1 | 3/2013 |
| EP | 3 210 763 | 8/2017 |
| JP | 3845247 | 11/2006 |
| JP | 4795630 | 10/2011 |
| JP | 2015088724 | 5/2015 |
| JP | 2017032831 | 2/2017 |
| WO | WO02064354 A1 | 8/2002 |
| WO | WO2004113042 A2 | 12/2004 |
| WO | WO2007065880 A2 | 6/2007 |
| WO | WO2013085947 A1 | 6/2013 |

\* cited by examiner

METHODS FOR SOLID FREEFORM FABRICATION

FIELD OF INVENTION

The present invention relates to compositions of high performance polymers, and methods and apparatus for creating three-dimensional articles using the compositions.

BACKGROUND

Three-dimensional (3D) printing refers to processes that create 3D objects based upon digital 3D object models and a materials dispenser. In 3D printing, a dispenser moves in at least 2-dimensions and dispenses material according to a determined print pattern. To build a 3D object, a platform that holds the object being printed is adjusted such that the dispenser is able to apply many layers of material, and printing many layers of material, one layer at a time, may print a 3D object.

A conventionally known 3D printing process is the UV ink-jet process. It is a three-stage process of applying a material, printing a UV-curable liquid, and finally hardened using a UV source. These steps are repeated layer-by-layer. In conventional 3D printing, disclosed in U.S. Pat. Nos. 6,375,874 and 6,416,850, generally an inkjet type print head delivers a liquid or a colloidal binder material to layers of a powdered build material. The printing technique involves applying a layer of a powdered build material to a surface typically using a roller. After the build material is applied to the surface, the print head delivers the liquid binder to predetermined areas of the layer of material. The binder infiltrates the material and reacts with the powder, causing the layer to solidify in the printed areas by, for example, activating an adhesive in the powder. The binder also penetrates into the underlying layers, producing interlayer bonding. After the first cross-sectional portion is formed, the previous steps are repeated, building successive cross-sectional portions until the final object is formed.

The oldest and the best-known laser-based 3D printing process is stereolithography (SLA). In this process, a liquid composition of a radiation-curable polymer is hardened layer-by-layer by using a laser. A similar process is Selective Laser Sintering (SLS) in which a thermoplastic or a sinterable metal is sintered selectively layer-by-layer by a laser to form the 3D object.

U.S. Pat. No. 5,121,329 describes the fused deposition modeling (FDM) process for the production of three-dimensional objects using an extrusion-based, digital manufacturing system. There are also other known processes that are substantially analogous with slight differences, for example fused filament fabrication (FFF), melt extrusion manufacturing (MEM) or selective deposition modeling (SDM).

In the FDM method, two different polymer filaments are melted in a nozzle and are printed selectively. One of the materials involves a support material, which is needed only at locations above which an overhanging part of the 3D object is printed and requires support during the subsequent printing procedure. The support material can be removed subsequently, e.g. via dissolution in acids, bases or water. The other material (the build material) forms the actual 3D object. Here again, the print is generally achieved layer-by-layer.

SUMMARY

The present invention provides compositions, methods, processes, and systems for manufacture of three-dimensional articles composed of polymers, such as high performance polymers (HPP).

Disclosed are compositions of HPP. The compositions comprise a first HPP dissolved in a solvent, and a second HPP as a solid.

In one aspect, a method for printing a three-dimensional article is provided. The disclosed method comprises depositing a powder of HPP on a build plate to form a powder bed, printing a composition comprising a first HPP dissolved in a solvent and a second HPP as a solid on the powder bed, exposing the printed composition to a stimulus to form a polymer layer of the three-dimensional article, and, repeating the steps to manufacture remainder of the three-dimensional article.

In another aspect, disclosed are methods for manufacturing a three-dimensional article, the method comprising depositing a composition comprising a first high performance polymer (HPP) dissolved in a solvent and a second HPP as a solid into a mold to form the three-dimensional article, and removing the three-dimensional article from the mold.

These and other aspects of the present invention will become evident upon reference to the following detailed description.

BRIEF DESCRIPTION OF DRAWINGS

FIG. 1 illustrates a method of printing a three-dimensional article layer by layer as disclosed herein. FIG. 2 illustrates the procedure for preparing a rectangular 3D product by molding a paste of powder PEEK and BPA-PEEK solution.

FIG. 3 illustrates 3D products manufactured by syringe printing a powder PEEK and BPA-PEEK solution.

DETAILED DESCRIPTION

I. Definitions

Figure 1A:
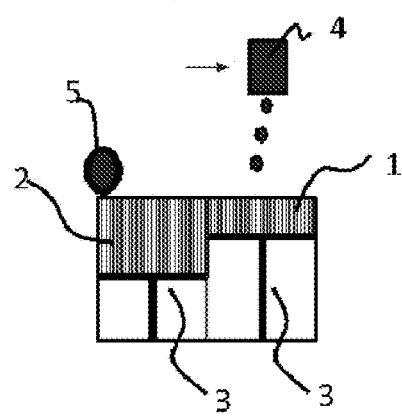
In FIG. 1A, the roller 5, deposits a high performance polymer (HPP) as a powder from a powder bed reservoir 2 to the powder bed 1. The build plate 3 can move in an up and down direction as needed. The head 4 prints a HPP composition on the powder bed 1.
Figure 1B:
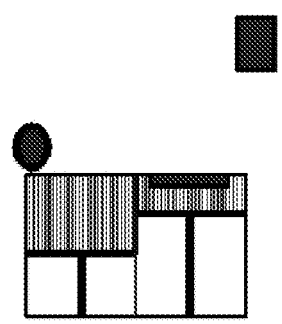
FIG. 1B shows a single layer being patterned.

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise.

As used herein, a "build plate" refers to a solid surface made from material such as glass, metal, ceramic, plastic, polymer, and the like.

The term "optional" or "optionally" means that the subsequently described event or circumstance may or may not occur, and that the description includes instances where the event or circumstance occurs and instances where it does not.

All publications, patents and patent applications cited herein, whether supra or infra, are hereby incorporated by reference in their entirety.

II. Overview

Disclosed are methods for additive manufacturing of high performance polymer (HPPs) that is based upon the use of HPP solutions to bind and fuse insoluble particles of HPPs and methods for manufacturing articles made of polymers using three-dimensional printing. The disclosed methods have the advantage of being able to rapidly print three-dimensional articles that have better mechanical properties, better thermal properties, and the like. The disclosed methods are more flexible than other art methods in that they allow the three-dimensional article to be built around another, such as a conducting wire to make a circuit. In addition, the manufactured articles have molecular structural features and physical properties that match those of the final polymers, such as Kapton® polymers, polyketone polymers, and polyethersulfone polymers.

In one application, soluble polyether ether ketone (PEEK) polymers can be prepared and dissolved in organic solvents such as toluene, carvone, THF, and benzene. The solutions can be used to bind insoluble particles (10-50 micron diameters) of a HPP, such as PEEK, or any other polymer. The resulting mixture can form a paste that can be molded or extruded, and then sintered. Molding prior to sintering provided a means to generate parts from HPPs that were cast from non-reconfigurable designs. Material extrusion provided a means to generate 3D objects from digitally reconfigurable designs using material extrusion printers. The HPP solutions can also be formulated to have viscosities ranging from 1-50 cP, allowing for ink jet printing. The solutions of HPPs can be printed by ink jetting into beds of insoluble HPP powder particles, thus enabling additive manufacturing of HPP-based parts by means of binder jetting at room temperature. The final printed parts can be cured, such as sintering, to provide the final product. The final product thus obtained has increased mechanical strength, tensile modulus, and elastic modulus in comparison with the green body prints.

III. Polymers

The three-dimensional form can be made from one or more materials. In certain embodiments, the three-dimensional form can comprise polymers. Any type of polymer can be used to form the three-dimensional form, and the polymer can be selected such that the three-dimensional form has the desired properties. Thus, the polymer can be polyimides, polyketones, reduced form of polyketones, polyethersulfones, and the like.

Polyketone Polymers

In one aspect, the three-dimensional form can be made from a final polymer that is a polyketone, such as polyetheretherketone (PEEK), polyaryletherketone (PAEK), polyetherketone (PEK), polyetherketoneketone (PEKK) polyetheretheretherketone (PEEEK), polyetheretherketoneketone (PEEKK), polyetherketoneetheretherketone (PEKEKK), or polyetherketoneketoneketone (PEKKK). If the polyketone polymer is PEEK, it typically can be obtained by reacting a substantially equimolar mixture of at least one aromatic dihydroxy compound and at least one dihalobenzoid compound or at least one halophenol compound, as shown below:

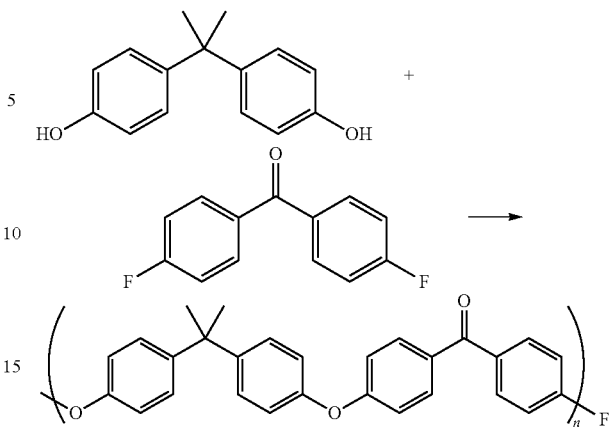

Non-limiting examples of aromatic dihydroxy compounds useful in such a process are hydroquinone, 4,4'-dihydroxybiphenyl and 4,4'-dihydroxybenzophenone. Exemplary suitable aromatic dihydroxy compounds include bis(hydroxyaryl)alkanes such as bis(4-hydroxyphenyl) methane, bis(2-methyl-4-hydroxyphenyl)methane, bis(3-methyl-4-hydroxyphenyl)methane, 1,1-bis(4'-hydroxyphenyl)ethane, 1,2-bis(4'-hydroxyphenyl)ethane, bis(4-hydroxyphenyl)phenylmethane, bis(4-hydroxyphenyl) diphenylmethane, bis(4-hydroxyphenyl)-1-naphthylmethane, 1,1-bis(4'-hydroxyphenyl)-1-phenylethane, 1,3-bis(4'-hydroxyphenyl)-1,1-dimethylpropane, 2,2-bis(4'-hydroxyphenyl)propane ["Bisphenol A"], 2-(4'-hydroxyphenyl)-2-(3"-hydroxyphenyl)propane, 1,1-bis(4'-hydroxyphenyl)-2-methylpropane, 2,2-bis(4'-hydroxyphenyl)butane, 1,1-bis(4'-hydroxyphenyl)-3-methylbutane, 2,2-bis(4'-hydroxyphenyl)pentane, 2,2-bis(4'-hydroxyphenyl)-4-methylpentane, 2,2-bis(4'-hydroxyphenyl)hexane, 4,4-bis(4'-hydroxyphenyl)heptane, 2,2-bis(4'-hydroxyphenyl)octane, 2,2-bis(4'-hydroxyphenyl)nonane, bis(3,5-dimethyl-4-hydroxyphenyl)methane, 2,2-bis(3'-methyl-4'-hydroxyphenyl)propane, 2,2-bis(3'-ethyl-4'-hydroxyphenyl)propane, 2,2-bis(3'-n-propyl-4'-hydroxyphenyl)propane, 2,2-bis(3'-isopropyl-4'-hydroxyphenyl)propane, 2,2-bis(3'-sec-butyl-4'-hydroxyphenyl) propane, 2,2-bis(3'-tert-butyl-4'-hydroxyphenyl)propane, 2,2-bis(3'-cyclohexyl-4'-hydroxyphenyl)propane, 2,2-bis(3'-allyl-4'-hydroxyphenyl)propane, 2,2-bis(3'-methoxy-4'-hydroxyphenyl)propane, 2,2-bis(3',5'-dimethyl-4'-hydroxyphenyl)propane, 2,2-bis(2',3',5',6'-tetramethyl-4'-hydroxyphenyl)propane, 2,2-bis(3'-chloro-4'-hydroxyphenyl)propane, 2,2-bis(3',5'-dichloro-4'-hydroxyphenyl)propane, 2,2-bis(3'-bromo-4'-hydroxyphenyl)propane, 2,2-bis(3',5'-dibromo-4'-hydroxyphenyl)propane, 2,2-bis(2',6'-dibromo-3',5'-dimetyl-4'-hydroxyphenyl)propane, bis(4-hydroxyphenyl) cyanomethane, 3,3-bis(4'-hydroxyphenyl)-1-cyanobutane, 2,2-bis(4'-hydroxyphenyl)hexafluoropropane and the like.

Non-limiting examples of dihalobenzoid compounds useful in such a process are 4,4'-difluorobenzophenone, 4,4'-dichlorobenzophenone, 4-chloro-4'-fluorobenzophenone, and the like; non limitative examples of halophenols compounds useful in such a process are 4-(4-chlorobenzoyl) phenol and (4-fluorobenzoyl)phenol. Accordingly, PEEK polymers can be produced by the nucleophilic process as described in, for example, U.S. Pat. No. 4,176,222, or by electrophilically polymerizing the starting materials as described in U.S. Pat. No. 6,566,484. Other poly(aryl ether ketone)s can be produced by starting from other monomers such as those described in U.S. Patent Application No. 2003/0130476. If the polyketone polymer is PAEK, PEK, PEKK, PEEEK, PEEKK, PEKEKK, or PEKKK, they can be synthesized using known methods. Alternatively and equivalently, a commercially available PEEK, PAEK, PEK, PEKK, PEEEK, PEEKK, PEKEKK, or PEKKK polymer can be used.

The aromatic dihydroxy compounds can comprise one or more alkene groups, one or more thiol groups, or one or more epoxide groups that can participate in photo-initiate thiol-ene polymerization. Exemplary structures are shown below:

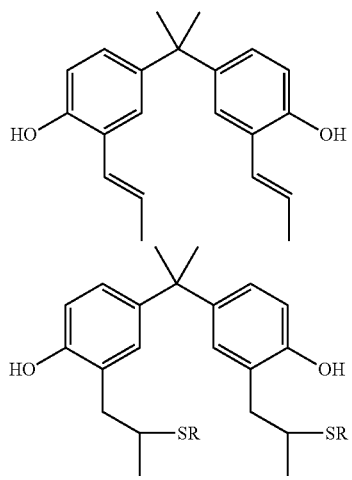

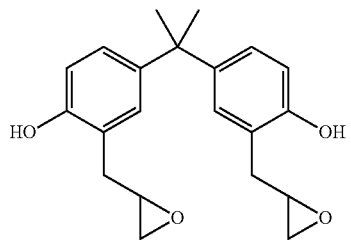

It should be appreciated that all compounds having one or more alkene functional groups are suitable in conjunction with the teachings presented herein. However, it is generally preferred that the polyalkene or alkene compound has at least two alkene groups. The alkene groups may be provided by allyls, allyl ethers, vinyl ethers, acrylates. For example, the olefin moiety can be selected from any suitable ethylenically unsaturated group such as allyls, allyl ethers, vinyl, vinyl ether, acetyl, acrylate, methacrylate, maleimide, norbornene or other monomers containing a carbon-carbon double bond, or combinations thereof. For example, the monomer can be 2,2'-diallylbisphenol-A, O,O'-diallylbisphenol A, 3,3'-diallylbisphenol A, and bisphenol A bisallyl carbonate. Other allylic monomers include diallyl phthalate, diethylene glycol bisallyl carbonate, and diallyl diphenate.

A polyketone polymer can be obtained by reacting a mixture of at least one monomer having an alkene group, at least one aromatic dihydroxy compound and at least one dihalobenzoid compound or at least one halophenol compound, as shown below:

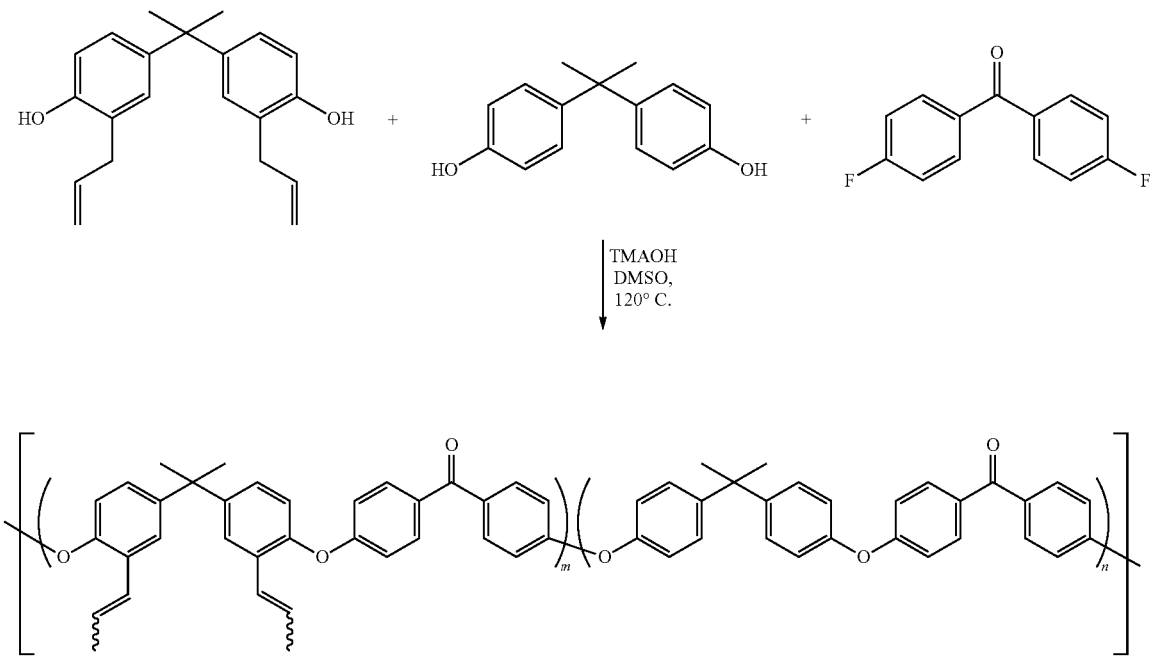

The three monomers can be arranged in alternating sequence or in a random order as blocks of monomers, and can be in any ratio. Preferably, the ketone monomer is about 50% of the reaction mixture. Thus, the reaction mixture can contain a substantially equimolar mixture of the dihydroxy compounds and the dihalobenzoid compound. Thus, the ratio of the monomer having the alkene group to the aromatic dihydroxy monomer can be 100:0, 95:5, 90:10, 75:25, 50:50, 25:75, 10:90, 5:95, 0:100, or any other ratio in between.

The HPP can be a ketal of the polyketone polymer, where one or more of the carbonyl group ($>C=O$) can be converted to a diether ($>C(OR)_2$), where each R can be independently selected to be alkyl, alkylene, alkenylene, aryl, or combination thereof. The ketal can be produced by reaction of the carbonyl group with, for example, an alcohol, such as a primary alcohol, a secondary alcohol, a tertiary alcohol, or a combination thereof. The ketal can be acyclic, cyclic, or spiro cyclic ketal. The HPP can also be a thioketal, a dithioketal, or a hemiketal of the polyketone polymer. The ketal, hemiketal, thioketal or dithioketal can be obtained by reacting the dihalobenzoid compound with the alcohol or with a thiol, as shown below:

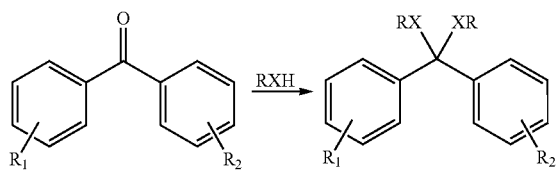

where X can be a hetero atom, such as oxygen or sulfur. Examples of suitable monofunctional alcohols include methanol, ethanol, various linear and branched isomers of propanol, butanol, pentanol, hexanol, octanol, nonanol, decanol, undecanol, dodecanol, tetradecanol, cetyl alcohol, and stearyl alcohol; cycloalkyl alcohols such as cyclohexanol, cyclooctanol, norbornyl alcohol, and the like; alkynyl alcohols such as ethynyl alcohol, 3-methylpent-1-yn-3-ol, tetradec-9-ynol, and the like; aryl and alkaryl alcohols such as phenol, benzyl alcohol, toluol, xylyl alcohol, 5-phenyl-pentanol, and the like; and alcohols having various functional groups, for example 1,1,1-trichloro-2-methyl-2-propanol, 5-fluoro-1-pentanol, 5-amino-1-pentanol, 5-benzyloxy-1-pentanol, 5-methoxy-1-pentanol, 3-nitro-2-pentanol, 4-methylthio-1-butanol, 6-hydroxyhexanoic acid, lactamide, and the like. In some embodiments, the ketal can by a cyclic ketal formed by the reaction of polyols with the carbonyl moieties. Examples of suitable polyols include 1,2-ethanediol (ethylene glycol), 1,2-propanediol (propylene glycol), 1,3-propanediol, 1,2,3-propanetriol (glycerol), diglycerol (a mixture of glycerol dimers coupled at primary and secondary hydroxyl moieties), 2,2-dimethyl-1,3-propanediol (neopentyl glycol), 3-mercaptopropane-1,2-diol (thioglycerol), dithiothreitol, 1,1,1-trimethylolpropane, 1,2-butanediol, 1,3-butanediol, pentaerythritol, cyclohexane-1,2-diol, 1,4-dioxane-2,3-diol, and the like.

The ketal, hemiketal, thioketal or dithioketal of polyketone can then be used as the HPP for performing the polymerization reaction wherein the final polymer is produced. Alternatively, the polymer can first be obtained, and at least one of the carbonyl groups can then be converted to a ketal, hemiketal, thioketal or dithioketal to provide the HPP.

When the HPP is a ketal of PEEK, the carbonyl group of the ketone moiety can be readily regenerated by hydrolysis using water, acidic solution, heat, light, base catalysis, catalytic hydrogenation, or a combination thereof. For example, the ketal of PEEK can be converted to the final polyketone polymer using a stimulus that is a Brønsted acid or a Lewis acid based reagent. Thus, for example, dilute solution of hydrochloric acid, hydrobromic acid, perchloric acid, acetic acid, sulfuric acid, arylsulfonic acids and hydrates thereof, such as p-toluenesulfonic acid monohydrate, phosphoric acid or orthophosphoric acid, polyphosphoric acid, sulfamic acid, and the like can be used as the stimulus. In other embodiments, the acid catalysts employed are aprotic, also referred to as Lewis Acids. Such Lewis acid catalysts can include, for example, titanium tetrachloride, aluminum trichloride, boron trifluoride, stannic chloride, and the like. In some embodiments, more than one type of acid catalyst is used; thus, blends of one or more of the acids mentioned above may be used in a mixture to catalyze the reactions.

The polyketone polymer can have a molecular weight such that the three-dimensional article has high strength and is not brittle. The polyketone preferably have an average molecular weight from 1,000 to 400,000, more preferably from 10,000 to 350,000, still more preferably from 15,000 to 100,000. Thus, the polyketone can have an average molecular weight of about 5,000, 7,000, 10,000, 15,000, 17,000, 19,000, 20,000, 22,000, 23,000, 24,000, 25,000, and the like.

In another aspect, the polyketone has an average molecular weight (in Daltons) where the molecular weight distribution is in a range of about 500 to about 20,000, preferably a range of about 1,000 to about 10,000, or more preferably, a range of about 3,000 to about 7,000. Thus, the polyketone can have a molecular weight distribution between about 3,000 to about 5,000, about 10,000 to about 13,000, about 15,000 to about 18,000, about 23,000 to about 27,000, and the like.

The polyketone HPP can be converted to the final polyketone polymer by exposing it to a stimulus, such as, heat, light, electrolysis, metal catalyst, or a chemical oxidant, as is known in the art. The light can be ultraviolet, infrared, visible, or combination thereof. The light sources are conventionally well known in the art, and include a low-pressure, a medium-pressure or a high-pressure mercury lamp, and a metal halide lamp, a xenon lamp, a cathode tube, a LED, and the like. In one embodiment, the application of light can be under neutral conditions, optionally in the presence of a catalyst, such as iodine, indium(III) trifluoromethane-sulfonate or tetrakis(3,5-trifluoromethylphenyl) borate, a Lewis acid catalyst, and the like.

In one aspect, the three-dimensional article made from a final polymer that is a polyimide polymer. The polyimide polymer can be selected based on its properties, such as high adhesion properties, high strength, mechanical properties, heat resistance, chemical resistance, electrical insulation, and the like. The polyimide polymers can be prepared by imidization of the poly(amic acid), using methods known in the art. Thus, for example, the poly(amic acid) can be exposed to a stimulus that is heat or a chemical imidization reactant. Alternatively, and equivalently, commercially available polyimide polymer can be used.

In another aspect, the three dimensional object can be made from a final polymer that is a polysulfone polymer. Polysulfones, as used herein, refers to a family of polymers which contain the subunit -aryl-$SO_2$-aryl-, more specifically -aryl-$SO_2$-aryl-O—, as shown below:

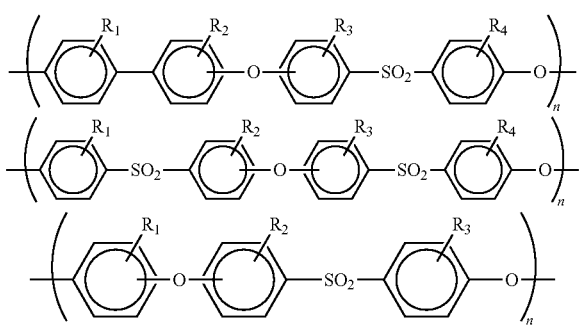

where $R_1$, $R_2$, $R_3$, $R_4$ are independently selected to be an alkyl, an alkylene, an aryl, or a halogen. Aromatic polyethersulfones can be prepared, for example, by the reaction of dialkali metal salts of diphenols with dihalodiarylsulfones in a solvent. The dialkali salts of diphenols may also be produced in situ or may be produced in a separate reaction. The diphenols can be any one as described above or known in the art. The polysufones includes a polymer of 4-[2-(4-hydroxyphenyl)propan2-yl]phenol and 4-(4-hydroxyphenyl)sulfonylphenol, commonly known as polysulfone, and a polymer of benzene-1,4-diol and 4-(4-hydroxyphenyl)sulfonylphenol commonly known as polyethersulfone. Polyethersulfone (PES) is also known as polyarylethersulfone (PAES) and/or polyphenylsulfone (PPSU). Another suitable polysulfone is a copolymer of 4-(4-hydroxyphenyl)phenol and 4-(4-hydroxyphenyl)sulfonylphenol, also known as polyphenylsulfone. Other exemplary polysulfones are described in U.S. Pat. No. 5,911,880.

Polyethersulfones can be produced by a variety of methods. For example, U.S. Pat. Nos. 4,108,837 and 4,175,175 describe the preparation of polyarylethers and in particular polyarylethersulfones. U.S. Pat. No. 6,228,970 describes the preparation polyarylethersulfones with improved polydispersity and lower amounts of oligomers. British patent GB 1,264,900 teaches a process for production of a polyethersulfone comprising structural units derived from 4,4'-biphenol, bisphenol-A (4,4'-isopropylidenediphenol), and 4,4'-dichlorodiphenylsulfone. Thus, the polysulfone polymers can be synthesized using known methods. Alternatively, and equivalently, commercially available polysulfone polymers can be used.

IV. Solid High Performance Polymers

A solid powder of any high performance polymer (HPP) can be obtained as a solid by removal of the solvent. The HPP can be further treated to provide a powder having the desired particle size distribution or particle shape. The particle size of the solid HPP can be reduced by utilizing mechanical devices, such as, for example, mortar and pestle, milling, application of ultrasonic energy, by spray drying, or by shearing the particles in a liquid flowing at high velocity in a restricted passage. For example, the solid HPP can be ground using a mortar, it can be milled, it can micronized, or it can be nanonized to provide HPP powder with the desired average particle size. Thus, the solid HPP can be milled to provide poly(amic acid) powder having an average particle size of about 5 microns to about 250 microns, or about 10 microns to about 100 microns, and the like. Thus, the HPP powder can have an average particle size of about 5 microns to about 25 microns, about 20 microns to about 60 microns, about 10 microns to about 20 microns, about 20 microns to about 30 microns, about 40 microns to about 50 microns, or about 25 microns to about 50 microns.

HPP powder having an average particle size of between 10 nm and 10 microns are useful in the compositions described herein. In some aspects, the particles can be nanoparticles having diameters of about 1 nm to about 1000 nm, from about 10 nm to about 200 nm, and from about 50 nm to about 150 nm. In another aspect, the particles can have a size range from about 500 nm to about 600 nm.

The particles can have any shape but are generally spherical in shape. Suitable particles can be spheres, spheroids, flat, plate-shaped, tubes, cubes, cuboids, ovals, ellipses, cylinders, cones, or pyramids. The particles can also have random or ill-defined shapes or can be amorphous.

Preferably, the method used to form the powder produces a monodisperse distribution of particles. However, methods producing polydisperse particle size distributions can be used. If the method does not produce particles having a monodisperse size distribution, the particles can be separated following particle formation to produce a plurality of particles having the desired size range and distribution. Alternatively, and equivalently, commercially available HPP can be used in the disclosed methods.

V. HPP Compositions

The HPP compositions comprise a first HPP dissolved in a solvent and a second HPP that is insoluble in the solvent and is initially present as solid material. The first HPP and the second HPP can be the same polymer or can be different, and can be polyimides, polyketones, reduced forms of polyketones, polyethersulfones, or combinations thereof.

The polyketone polymer or any other high performance polymer (HPP) can be dissolved in a solvent. The solvent used in carrying out the disclosed methods is preferably an inert organic solvent that is polar, which can have a high boiling point, and in which the HPP is soluble, but the final polymer is insoluble or has lower solubility. Examples of the solvent that can be used include solvents having a nitrogen atom in the molecule such as N,N-dimethylacetamide, N,N-diethylacetamide, N,N-dimethylformamide, N,N-diethylformamide, N-methyl-2-pyrrolidone, 2-pyrolydon, N-methyl-2-pyrolydon, 1,3-dimethyl-2-imidazolidinone, and N-methylcaprolactam; solvents having a sulfur atom in the molecule such as dimethyl sulfoxide, diethyl sulfoxide, dimethyl sulfone, diethyl sulfone, and hexamethyl sulfolamide, tetramethylene sulfone; solvents which are phenols such as cresol, phenol, and xylenol; solvents having an oxygen atom in the molecule such as diethylene glycol dimethyl ether (diglyme), triethylene glycol dimethyl ether (triglyme), and tetraglyme; aromatic solvents such as benzene, toluene, ethylbenzene, chlorobenzene, o-xylene, m-xylene, p-xylene, mesitylene, i-propylbenzene, 1-chlorobenzene, 2-chlorotoluene, 3-chlorotoluene, 4-chlorotoluene, t-butylbenzene, n-butylbenzene, i-butylbenzene, s-butylbenzene, 1,2-dichlorobenzene, 1,3-dichlorobenzene, 1,4-dichlorobenzene, 1,3-diisopropylbenzene, 1,4-diisopropylbenzene, 1,2-difluorobenzene, 1,2,4-trichlorobenzene, 3-methylanisole, 3-chloroanisole, 3-phenoxytoluene, diphenyl ether, anisole, and mixtures thereof and other solvents such as acetone, dimethylimidazoline, methanol, ethanol, ethylene glycol, dioxane, tetrahydrofuran, pyridine, and tetramethylurea. In addition, amido based solvents can be used, such as $R_3O—(CH_2)_nC(O)NR_1R_2$, where $R_1$, $R_2$, and $R_3$ can be independently selected to be H or lower alkyl, such as methy (Me), ethyl (Et), n-propyl (n-Pr), iso-propyl (i-Pr), n-buty (n-Bu), s-butyl (s-Bu), tert-butyl (t-Bu), and the like. These may be used in combination of two or more. In one aspect, the solvent can be N-methyl-2-pyrrolidone (NMP), N,N-dimethylformamide (DMF), N,N-dimethylacetamide (DMAc), or combinations thereof.

The solvent can also be a terpene, such as, for example, but are not limited to, menthol, d-limonene, limonene oxide, geraniol, α-pinene, α-pinene oxide, thymol, menthone, neomenthol, 3-carene, 1-carvol, carvone, carveol, 1,8-cineole (eucalyptol), citral, dihydrocarveol, dihydrocarvone, 4-terpinenol, fenthone, pulegone, pulegol, isopulegol, piperitone, camphor, a-terpineol, terpinen-4-ol, linalool, carvacrol, trans-anethole, ascaridole, safrole, racemic mixtures thereof, isomers thereof, and mixtures thereof. Thus, the solvent can be an acyclic terpene such as terpene hydrocarbons (e.g. ocimene, myrcene), terpene alcohols (e.g. geraniol, linalool, citronellol), or terpene aldehydes and ketones (e.g. citral, pseudoionone, β-ionone). The solvent can be a monocyclic terpenes, such as terpene hydrocarbons (e.g. terpinene, terpinolene, limonene), terpene alcohols (e.g. terpineol, thymol, menthol), or terpene ketones (e.g. pulegone, carvone). The solvent can be a bicyclic terpene such as terpene hydrocarbons (e.g. carane, pinane, bornane), terpene alcohols (e.g. borneol, isoborneol), or terpene ketones (e.g. camphor).

The solvent can be alloocimene, alloocimene alcohols, anethole, anisaldeyde, camphene, camphor, 10-camphorsulphonic acid, 3-carene, citral, cintronellal,citronellol, p-cymene, dipentene (p-mentha-1,8-diene), geraniol, 7-hydroxy-dihydrocitronellal, 7-methoxydihydro-citronellal, isoborneol, isobornyl acetate, p-menthan-8-ol, p-menthan-8-yl acetate, menthol, menthone, nopol, ocimene, dihydromycenol, 3,7-dimethyl-1,6-octadiene, pinane, 2-pinane hydroperoxide, pine oil, α-pinene, β-pinene, 2-pinanol, α-terpineol, β-terpineol, γ-terpineol, terpin hydrate, α-terpinyl acetate, and mixtures thereof.

The solvent can be an aqueous solvent, such as water or a mixture of water and an organic solvent, acid, base, and the like.

The HPP can be dissolved in a solvent, such as an organic solvent or an aqueous solvent. An organic solvent can be NMP, DMF, DMAc, a terpene, toluene, or any of the others described in detail above. The HPP can be dissolved to provide a 1% solution, a 2% solution, a 3% solution, a 4% solution, a 5% solution, a 6% solution, a 7% solution, a 8% solution, a 8% solution, a 10% solution, a 15% solution, a 20% solution, a 25% solution, a 30% solution, a 35% solution, a 40% solution, a 45% solution, a 50% solution, and the like.

The solution of dissolved HPP can be used to bind insoluble particles of a polymer or a HPP. In one aspect, to the solution of dissolved HPP is added a second HPP that is present as a solid and is soluble in the solvent. The resultant mixture can be subjected to conditions such that a paste is obtained. The paste can be molded or extruded to generate objects from HPPs that were cast from non-reconfigurable designs.

In another aspect, to the solution of dissolved HPP is added particles of insoluble HPP, and the resultant mixture can be subjected to conditions such that a viscous solution is obtained. The viscosity of the composition can typically be from about 0.1 centipoise (cp) to about 100 cp, preferably about 1 cp to about 50 cp. The viscosity of the HPP compositions can be adjusted by adding more or less solvent, by selecting the concentration of HPP solution, or any other means known in the art. The viscosity of the composition is such the composition flows thru the extrusion apparatus and at the extrusion temperature.

VI. Molding

The 3-dimensional objects can be formed by a molding process. Thus, the shaping and drying step can comprise operations of casting or molding the HPP compositions in cavities of suitable shape or cross section. The term molding should be taken in its broadest sense and covers any type of conformation, such as casting in an open mold, extrusion through a die and cutting of the extrudate, injection molding (injection compression molding, gas-assisted injection molding and insert molding etc.), blow molding, rotational molding, extrusion molding, press molding, transfer molding, and the like.

The HPP composition can be placed into a mold or extrusion-molding, and a 3D article having a desired shape can be produced. Optionally, a stimulus, such as heat or light can be applied.

VII. Printing

A solution of HPP composition and a powder of a HPP can be used in a process to create three-dimensional articles using a three-dimensional printing system. The HPP composition, as described in detail above, comprises a first HPP dissolved in a solvent and a second HPP present as a solid, wherein the mixture thus obtained is mixed to provide a viscous solution. A three-dimensional printing system can have a computer, a three-dimensional printer, and means for dispensing the HPP powder and the HPP composition. The three-dimensional printing system can optionally contain a post-printing processing system. The computer can be a personal computer, such as a desktop computer, a portable computer, or a tablet. The computer can be a stand-alone computer or a part of a Local Area Network (LAN) or a Wide Area Network (WAN). Thus, the computer can include a software application, such as a Computer Aided Design (CAD)/Computer Aided Manufacturing (CAM) program or a custom software application. The CAD/CAM program can manipulate the digital representations of three-dimensional articles stored in a data storage area. When a user desires to fabricate a three-dimensional article, the user exports the stored representation to a software program, and then instructs the program to print. The program prints each layer by sending instructions to control electronics in the printer, which operates the three-dimensional printer. Alternatively, the digital representation of the article can be directly read from a computer-readable medium (e.g., magnetic or optical disk) by printer hardware.

Typically, a first layer of the HPP solid or powder can be deposited onto a build plate. The deposited HPP solid or powder is preferably heated to a temperature that is less than about 200° C., and can be in the range of about 30° C. to 170° C., preferably in the range of about 50° C. to about 150° C. The temperature is selected such that it is below that of which polymerization of the HPP occurs, but aids in the polymerization of the HPP when the HPP composition is added. Thus, the deposited HPP solid or powder can be heated to a build temperature of about 40° C., 50° C., 60° C., 70° C., 80° C., 100° C., 110° C., 120° C., 130° C., 140° C., 150° C., 160° C., and the like. The deposited HPP solid or powder can be heated to the desired temperature using any of the known contact or non-contact methods, such as for example, using a heater including, but not limited to, a microwave heater, an infrared heater, an induction heater, a micathermic heater, a solar heater, a heat exchanger, an arc heater, a dielectric heater, a gas heater, a plasma heater, a lamp heater, an infrared heater or any combination thereof, by using a heated plate or a heated roller, or by locally heating the HPP solid or powder using a laser or a laser diode, such as, for example, a scanning carbon dioxide laser.

The first layer of the HPP solid or powder can be deposited onto the build plate using any of the known methods, such as, using a roller, using a scraper, using mechanical means, and the like. Thus, for example, a measured quantity of the HPP solid or powder can be distributed over the build plate to a desired thickness using a roller. In another aspect, the layer of the PEEK powder can have a thickness of about 0.1 nm to less than 500 nm, of about 5 nm to about 250 nm, of about 0.2 nm to about 100 nm, of about 0.3 nm to about 50 nm, of about 0.3 nm to about 25 nm, of about 0.3 nm to about 20 nm, of about 0.3 nm to about 15 nm, of about 0.3 nm to about 10 nm, of about 0.3 nm to about 5 nm, and the like. In yet another aspect, the layer of the PEEK powder can have a thickness of about 10 microns to less than about 500 microns, of about 25 microns to about 250 microns, or of about 50 microns to about 100 microns.

The method of printing a three-dimensional article layer by layer is illustrated in FIG. 1. In FIG. 1A, the roller 5, deposits HPP solid as a powder from one or more powder bed reservoir 2 to the powder bed 1. The build plate 3 can move in vertical direction as needed. The head 4 prints a HPP composition on the powder bed 1. The HPP composition can be printed onto the powder bed on the build plate by any printing mechanism. For example, printing may comprise inkjet printing, screen printing, gravure printing, offset printing, flexography (flexographic printing), spray-coating, slit coating, extrusion coating, meniscus coating, microspotting, pen-coating, stenciling, stamping, syringe dispensing and/or pump dispensing the activator solution in a predefined pattern.

In one aspect, the three-dimensional article can be formed by using a syringe or syringe-like dispenser to print the HPP composition on a build plate, as shown in FIG. 1. FIG. 1B shows a single layer being patterned. Typically, the syringe deposits a first layer of the HPP composition onto the build plate in a two-dimensional pattern. The syringe, such as Norm-Ject Luer Lock plastic syringes, preferably has a small orifice diameter, thereby enabling the formation of electronic features having a fine minimum feature size. In one aspect, the syringe or other deposition tool includes a deposition orifice having a diameter of not greater than about 200 more preferably not greater than 100 more preferably not greater than 50 μm and even more preferably not greater than about 25 The print speed is dependent on feature size and materials used, and can be easily determined by one of skill in the art and adjusted as desired, and can be between about 1 mm/sec to about 1000 mm/sec, about 5 mm/sec to about 500 mm/sec, about 20 mm/sec to about 100 mm/sec, or about 10 mm/sec to about 50 mm/sec. Thus, the print speed can be between about 5 mm/sec to about 30 mm/sec, or between about 10 mm/sec to about 20 mm/sec.

The printing system can have a printing mechanism for printing a HPP composition onto the HPP solid or powder. For example, printing may comprise inkjet printing, single jet printing, screen printing, gravure printing, offset printing, flexography (flexographic printing), spray-coating, slit coating, extrusion coating, meniscus coating, microspotting, pen-coating, stenciling, stamping, syringe dispensing and/or pump dispensing the HPP solution in a predefined pattern, Thus, the three-dimensional article can be formed by using an ink jet type print cartridge to deposit the HPP composition from the ink jets onto a built plate. Ink jet print heads that can be used in the disclosed methods include MH5420, MH2480, MH2420, and MH1801, all available from Ricoh Printing Systems America, Inc.

Typically, an ink-jet nozzle prints a two-dimensional pattern of a HPP composition onto the HPP powder bed deposited on a built plate. The printed composition can be contacted with a stimulus wherein the HPP is converted, at least partially, to the final polymer. As described in detail below, the selected stimulus is dependent on the HPP, and can be heat, chemical oxidants, acids, light, electrolysis, metal catalysts, and the like. After a preset period of time that is selected to allow the HPP to partially or fully convert to the final polymer, the next layer of the HPP powder can be deposited to form a powder bed, and the steps repeated. Thus, a 3D article can be manufactured layer by layer.

Optionally, the printed solution can be exposed to a stimulus to form a polymer layer of the three-dimensional article. For example, the stimulus can be heat or a chemical imidization reactant. When the HPP is a ketal, the stimulus can be a Brønsted acid, a Lewis acid, or light. When the HPP is a polysulfide, the stimulus can be an oxidant, such as an organic peroxy acids, an organic peroxides, an inorganic peroxides, or mixtures thereof. When the HPP contain a cross-linking moiety, the stimulus can be light, such as visible light or UV light.

Figure 1C:
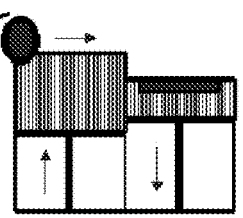
In FIG. 1C, the roller 5, deposits HPP from a powder bed reservoir 2 to the powder bed 1.
Figure 1D:
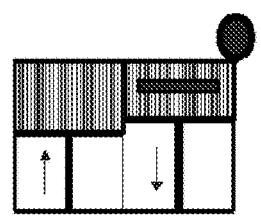
FIG. 1D shows that the HPP has formed a new powder bed layer, and the process can be repeated to print a three-dimensional article layer by layer

In FIG. 1C, the roller 5, as depositing mechanism, deposits HPP powder from a powder bed reservoir 2 to the powder bed 1. FIG. 1D shows that the HPP powder has formed a new powder bed layer, and the process can be repeated to print a three-dimensional article layer by layer.

In another aspect, the three-dimensional article can be formed by patterning successive layers on a build plate using lithography. The three-dimensional article can be formed by applying a layer of HPP powder to form a powder bed on a build plate. Heating the powder bed to a predetermined temperature. Printing HPP composition on the powder bed through a patterned imaging plate, such as a mask or reticle. The HPP composition can be deposited using any known methods, such as, for example, spraying, by using a syringe, by using an inkjet print head, and the like.

The region that received the jetted HPP composition is allowed to polymerize by maintaining the temperature for the duration of the hold time. Thus, the HPP powder exposed to the HPP composition can be allowed to stay at the hold temperature or the present temperature for about 1 minute to about 2 hours, preferably about 5 minutes to about 30 minutes, more preferably about 8 minutes to about 15 minutes, or from about 1 sec to about 300 sec, preferably about 5 sec to about 30 sec, more preferably about 8 sec to about 15 sec. Thus, the HPP powder exposed to the HPP composition can be allowed to stay on the plate at the hold temperature or the present temperature for hold time of about 7 minutes, about 8 minutes, about 9 minutes, about 10 minutes, about 11 minutes, about 12 minutes, about 13 minutes, about 14 minutes, about 15 minutes, and the like. Without being bound to a theory, the holding period allows volatile components of the fluid, such as the solvent, to evaporate, and the layer to polymerize or at least partially polymerize to form the final polymer. Thus, the holding time is selected such that the HPP can polymerize to the final polymer.

The process is repeated with a new layer of the HPP powder being applied over the top of the previous layer on the build plate. The next cross section of the desired product is then printed with the HPP composition being printed onto the new powder layer.

The previous steps of applying a layer of the HPP powder to the build plate, depositing a solution of activator and allowing it to stay on the build plate at a predetermined temperature and for a predetermined period of hold time are repeated until the final article is completed. The unreacted HPP powder can be removed, if desired, at any time during the process. Thus, a three-dimensional article can be built layer by layer by depositing a series of HPP layers on a build plate to form a powder bed, and printing the HPP composition onto the powder bed.

VIII. Curing

The three-dimensional article obtained using the methods and processes described above can be cured to obtain the final three-dimensional article. The curing of the article can be done while it is attached to the build plate, or the curing of the article can be done by separating it from the build plate first and then curing it. In the curing process, the unreacted prepolymer is converted to the final polymer. Thus, for example, if the prepolymer is poly(amic acid), the unreacted poly(amic acid) is converted to the polyimide polymer via imidization during the curing process.

In one aspect, during the curing process, the poly(amic acid) can be converted to a polyimide polymer by dehydration wherein water is eliminated. Imidization to produce the polyimide, i.e. ring closure in the poly(amic acid), can be effected through thermal treatment, chemical dehydration or both, followed by the elimination of a condensate. The polyimide polymer can be produced by a polymerization/imidization reaction according to a known method such as a thermal imidization by heat treatment accompanied by solvent removal and a chemical imidization, for example, by treatment with acetic anhydride accompanied by solvent removal.

In one aspect, chemical imidization can be used to convert the poly(amic acid) to the polyimide. Chemical imidization can be carried out using known agents, such as acetic anhydride; orthoesters, such as, triethyl orthoformate; coupling reagents, such as, carbodiimides, such as dicyclohexylcarbodiimide (DCC) and diisopropylcarbodiimide (DIC), boronic acid, boronic esters, and the like.

In yet another aspect, the curing of compounds such as polyimide and compositions or articles comprising polyimides can be accomplished by curing at elevated temperatures. The curing can be by isothermal heating at a temperature greater than about 190° C., preferably greater than about 250° C., more preferably greater than about 290° C. Thus, the thermal imidization can be carried out at about 280° C., about 290° C., about 300° C., about 310° C., about 320° C., about 350° C., about 375° C., and the like. The curing temperature is selected such that poly(amic acid) is converted to a polyimide and the temperature is below the glass transition temperature or the melting point of the polyimide.

Alternatively, the curing at elevated temperatures can be performed in an isothermal staging process. As an example, such an isothermal staging process can start by heating the material to be cured to 180° C. to 220° C., such as to about 200° C., for some time, typically 1 to 2 hours. However, also less time, such as less than 1 hour, or less than 30 minutes, can be used. Further, also longer times, such as up to 10 hours may be used. Subsequently, the temperature can be increased in steps. Each step may correspond to an increase of the temperature of 10° C. to 50° C. Further, each step may have duration of 30 minutes to 10 hours, such as 1 to 2 hours. The last step may be curing at a temperature of 250 to 400° C., such as at about 300° C. In an isothermal staging process the duration of each isothermal step may decrease as the temperature increases. A further example of an isothermal staging process, is a process starting at 150° C. in which the temperature is increased by 25° C. every hour until 300° C. is reached.

Curing the final product at elevated temperatures can be performed with continuously increasing temperature. Preferably, the heating rate is slow initially but gradually increased as the temperature increases. Thus, for example, the heating process can start at 150° C. and the temperature is increased continuously until 300° C. or above is reached.

The time of heating for thermal imidization can be about 0.1 h to about 48 h, such as 0.5 h to 15 hours, or 0.5 h to 5 h.

The polyimide polymer thus produced has a tensile strength at break of 150 MPa or higher, more preferably 200 MPa or higher, particularly preferably 250 MPa or higher. The tensile strength can be measured using known methods, such by using the Instron Load Frame instruments.

The polyimide polymer thus produced has a tensile modulus of 1.5 GPa or higher, more preferably 2.0 GPa or higher, particularly preferably 2.5 GPa or higher.

The three-dimensional articles prepared using the methods, processes, and systems of the invention are useful in circuit applications, medical applications, transportation applications, and the like. For example the three-dimensional articles can be a printed circuit, an insulator, a medical construct such as an orthotic device, a dental implant, prosthetic sockets, and the like, seal rings, washers, and the like.

EXAMPLES

The examples below are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Commercial powder PEEK was purchased from Evonik with a diameter of 20 μm or Victrex with a diameter of 50 and utilized as received. Mechanical properties of the prepared PEEK samples were examined by dynamic mechanical analyzer (DMA) 8000 from PerkinElmer. Sinusoidal forces were applied to rectangular samples within linear viscoelastic regions (strain 0.03 mm) under constant frequency (1 Hz for rectangular samples and 10 Hz for crosslinked film samples) as a function of temperature from 24° C. to 270° C. (150° C. for crosslinked films) at 3° C./min. Glass transition temperature ($T_g$) was determined to be a tan(δ) peak. Tensile testing of a dog bone sample (thickness of 3.1 mm and width of 5.2 mm) was performed by Instron 5500R with an extensometer (initial length of 25.4 mm) at a rate of 1 mm/min. Tensile (or Young's) modulus was calculated from the slope in the plot of tensile stress as a function of strain. Differential scanning calorimetry (DSC) studies of the commercial powder PEEK and the synthesized BPA-PEEK were conducted by a TA DSC Q20 calorimeter under nitrogen. Powder samples sealed in aluminum pans were first heated from room temperature to 380° C. at 10° C./min to remove any thermal history in the samples, and cooled to room temperature. Then the samples were second heated to 380° C. at 10° C./min, and heat flow as Watt from this second heating was recorded. Molecular weights of the synthesized BPA-PEEK were determined by gel permeation chromatography (GPC) equipped with three MZ gel 10 μm columns of pore sizes of $10^3$, $10^3$, and $10^5$ Å respectively, a DAWN-HELOS II 18-angle multi-angle laser light scattering detector, and an OptiLab T-rEx refractive index detector from Wyatt Technologies Corporation. THF was used as eluent at a rate of 1 mL/min. The absolute weight average molecular weights were determined by a do/dc value which was measured by assuming the 100% mass recovery of the polymers after passing the columns. Thermogravimetric analysis (TGA) of powder PEEK and BPA-PEEK was conducted by a TA TGA Q50 from room temperature to 800° C. at 10° C./min.

Example 1

Synthesis of High Molecular Weight BPA-PEEK Polymers
PEEK polymer having the following structure:

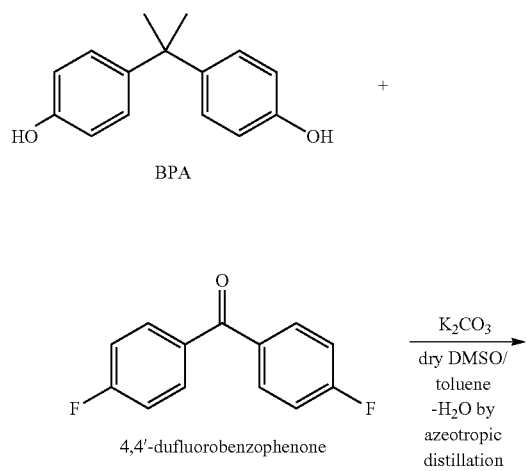

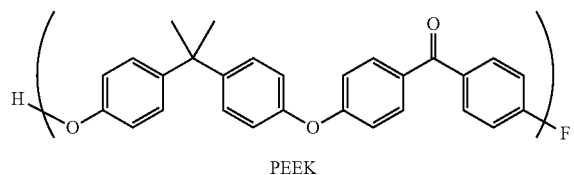

PEEK was synthesized. Bisphenol A (BPA, 11.46 g, 50 mmol), 4,4'-difluorobenzophenone (10.91 g, 50 mmol), and potassium carbonate (7.6 g, 55 mmol) were mixed in 100 mL of dry DMSO and 50 mL of dry toluene in a three neck flask connected with a $N_2$ gas inlet and Dean Stark trap with a condenser. This mixture was stirred in an oil bath at 150° C. (up to 160° C.) for 2 h, and then 170° C. (up to 180° C.) for 15 h (to 24 h). As polymerization proceeded, a solid product precipitated. The solution was cooled to room temperature, and the solvent was decanted to provide the solid product. The solid product was purified by dissolving the solid product in DCM (~200 mL), and adding cold methanol in an ice bath to precipitate the polymer solid. The resulting solid was washed with water to remove any remaining $K_2CO_3$ and filtered. For further purification, after drying, the solid product was dissolved in and adding cold methanol in an ice bath to precipitate the polymer solid. The polymer solid was air dried to provide a lightly brown to tan solid as a final product (21 g, 94% yield).

Example 2

Synthesis of Polymers Comprising an Alkene Moiety
PEEK polymer having the following structure:

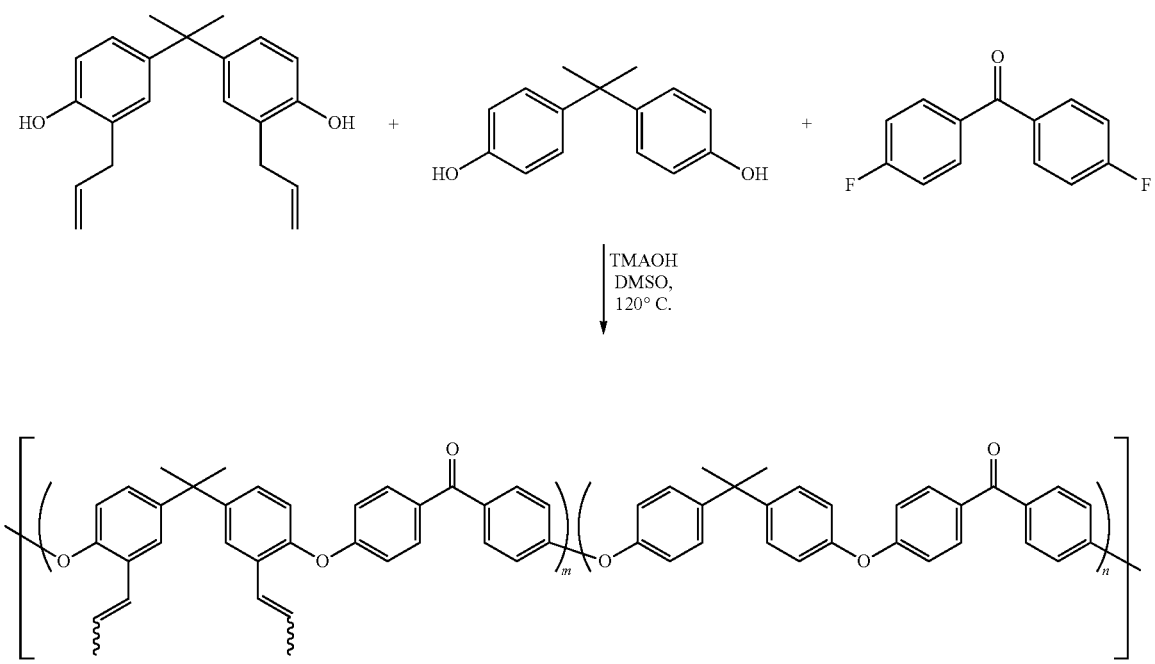

was synthesized. To a 100 mL flask was added 4,4'-difluorobenzophenone (3.30 g, 15.12 mmol), bisphenol A (1.72 g, 7.53 mmol), 2,2'-diallyl bisphenol A (2.33 g, 7.55 mmol) and DMSO (30 mL). The suspension was heated to 50° C. until all solids dissolved. To this solution was added tetramethylammonium hydroxide pentahydrate (5.54 g, 30.57 mmol) and the reaction temperature increased to 120° C. After 90 minutes, the reaction was cooled to room temperature and the liquid decanted. The remaining solids were dissolved in dichloromethane and precipitated into methanol to give the alkene-containing PEEK (4.69 g, 70% yield). Analysis by $^1$H-NMR spectroscopy showed a ~1:1 ratio of BPA:diallyl BPA units.

Example 3

Figures 2A, 2B, 2C, 2D:
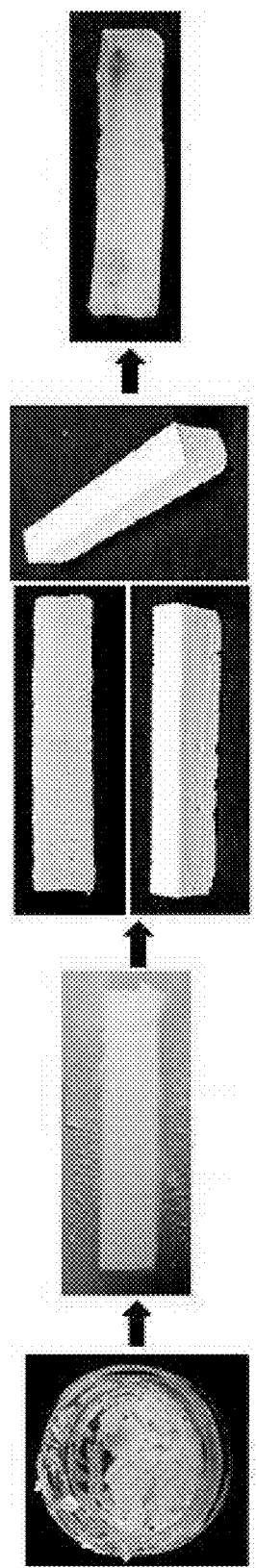
FIG. 2A shows the paste.
FIG. 2B shows the paste placed in a rectangular mold.
FIG. 2C shows the 3D rectangular product after it was removed from the mold.
FIG. 2D shows the 3D rectangular product after it was cured.

Synthesis of Polymers Comprising an Epoxide Moiety:

casted product was further dried at 220° C. for 3 h to remove any remaining solvent. The dried product was baked at high temperature by two methods as follows. In the first method, the dried product was baked at 332° C. (temperature range: up to 345° C.), which is below the melting temperature of the powder PEEK (345° C.), for 2 to 3 h. In the second method, the dried product was baked them above 360° C., above the melting temperature of the powder PEEK, for a short period time (i.e. 5 mins). The samples were heated from 220° C. to 365° C. (temperature range: 360° C. to 380° C.) at the rate of about 7° C./min, and kept at 365° C. for 5 mins (up to 20 mins depending on the size of samples) and cooled to room temperature (FIG. 2D). The product baked by the second method (baked above 360° C.) should be cooled to 150° C. slowly (for at least one hour) to minimize any distortion or bending of the sample. If the bottom side of the rectangles was not fully melted and the sample was

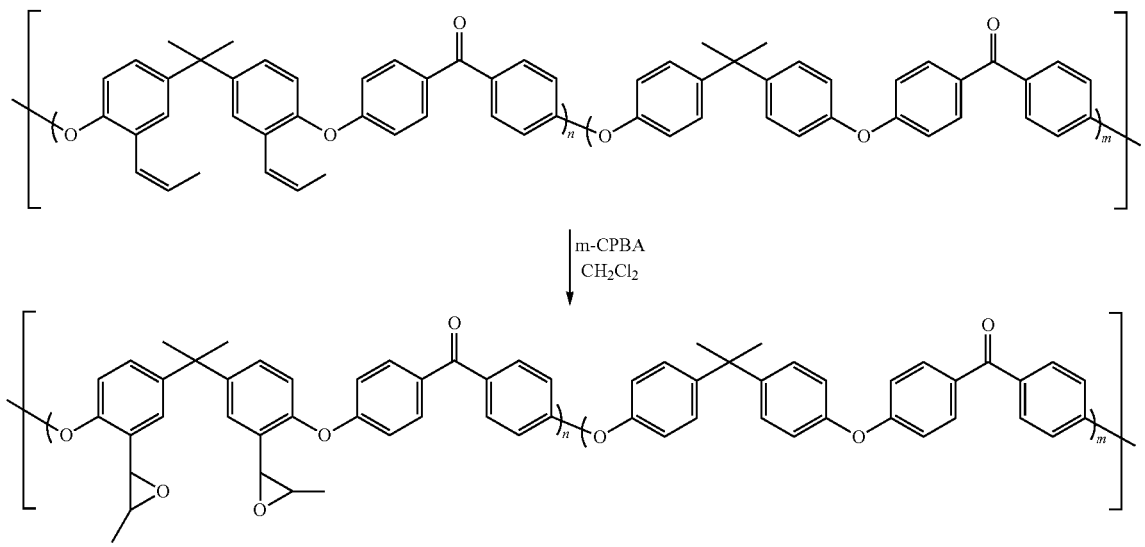

To a solution of the alkene-containing PEEK prepared in Example 1 (4.69 g, 10.51 mmol) in dichloromethane (75 mL) was added m-CPBA (5.21 g, 21.13 mmol). After stirring for 2 hours, the polymer was precipitated into methanol to give the epoxy-PEEK polymer (4.23 g, 87% yield). GPC analysis showed $M_n$=21.6 KDa; $M_w$=39.4 KDa; Đ=1.82.

Example 4

Preparation of Model Products Using PEEK Polymer:

The BPA-PEEK polymer prepared in Example 1 was dissolved in spearmint oil to provide a 6 weight % to 8 weight % BPA-PEEK solution. To 2 mL of the BPA-PEEK solution was added powder PEEK (1 g, purchased from Evonic) with a diameter of approximately 20 μm, and the mixture was stirred overnight at room temperature to provide a paste (semi-solid, FIG. 2A). The paste was molded to rectangular shapes (or a dog bone shape) of crosslinked polysiloxane (3.8 mm (T)×5.7 mm (W)×28.6 mm, FIG. 2B). The molded shape placed in an oven, and the temperature was increased at a rate of about 0.5° C./min to 120° C. (range from 100° C. to 150° C.) to prevent any cracking from fast heating to high temperature. After heating for 3 h, the rectangular product cast in the mixture of PEEK powder and BPA-PEEK was removed from the mold (FIG. 2C). The bent, the sample was reversed up to down and baked at 365° C. for additional 5 mins. After baking at 365° C., the dimensions of the sample were reduced to 2.9 mm×5.0 mm×22.4 mm.

To study the effect of soaking on the mechanical properties of the PEEK samples, the first baked, rectangular sample after DMA experiment was immersed into the PEEK solution in spearmint oil (6 weight % or 8 weight %) for 30 mins. The sample was dried in the air at room temperature, and further dried in a heating oven at 220° C. for 2 hrs. Then the sample was baked at 365° C. for 5 mins. This procedure is called "$1^{st}$ soaking and $2^{nd}$ baking" in this study. This sample was examined by DMA. The area of the rectangular sample for DMA experiment kept identical. Then the same sample after DMA was immersed in the PEEK solution, dried and baked under the identical conditions, which is call "$2^{nd}$ soaking and $3^{rd}$ baking."

Example 5

Preparation of 3D PEEK Products by Syringe Printing:

The BPA-PEEK polymer prepared in Example 1 was dissolved in spearmint oil to provide a 6 weight % BPA-PEEK solution. To 7.6 mL of the BPA-PEEK solution was added powder PEEK (2.5 g, purchased from Evonic) with a diameter of approximately 20 μm, and the mixture was stirred overnight at room temperature to provide viscous mixture of powder PEEK and BPA-PEEK solution.

Figure 3A:
FIG. 3A shows a 3D log-like structure manufactured by syringe printing.
Figure 3B:
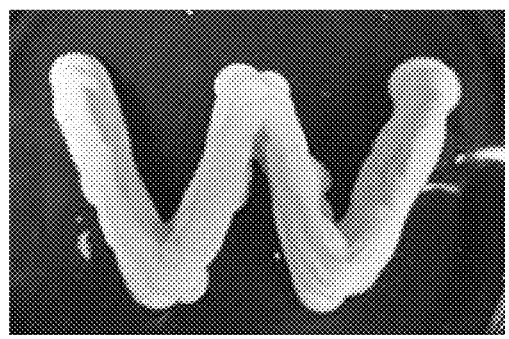
FIG. 3B shows the letter "W" created by syringe printing.

Using a 1 mL syringe, this mixture was printed on a glass slide at room temperature or a glass slide heated to around 50° C. by placing it on a hot plate. Multiple layers were added on the printed areas. In some cases, up to 10 layers were added. The printed samples were dried on a hot plate for at least 3 h. FIG. 3A shows a multiple-layered 3D log-like structure, while FIG. 3B shows the letter "W" having multiple layers, both prepared by the method described above.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

We claim:

1. A method for manufacturing a three-dimensional article, the method comprising:
   a. depositing a powder of a first high performance polymer (HPP) on a build plate to form a powder bed;
   b. depositing a composition at selected locations on the powder bed wherein the composition comprises:
      a homogeneous mixture of a second HPP dissolved in a solvent;
      wherein the composition further comprises particles of a third HPP that are dispersed in the homogeneous mixture of the second HPP and the solvent; and
      wherein the particles of the third HPP are insoluble in the homogeneous mixture;
   c. exposing the deposited composition to a stimulus to form a polymer layer of the three-dimensional article; and
   d. repeating steps (a)-(c) to manufacture remainder of the three-dimensional article.

2. The method of claim 1, wherein the composition has a viscosity of about 1 cP to about 50 cP.

3. The method of claim 1, wherein the second HPP comprises a polyketone.

4. The method of claim 2, wherein the polyketone comprises polyetheretherketone (PEEK), polyaryletherketone (PAEK), polyetherketone (PEK), polyetherketoneketone (PEKK) polyetheretheretherketone (PEEEK), polyetheretherketoneketone (PEEKK), polyetherketoneetheretherketone (PEKEKK), or polyetherketoneketoneketone (PEKKK).

5. The method of claim 1, wherein the third HPP comprises polyimides, polyketones, reduced forms of polyketones, and polyethersulfones, and wherein the third HPP is not soluble in the solvent.

6. The method of claim 1, where the stimulus is radiation or heat.

7. The method of claim 5, wherein radiation is ultraviolet radiation, visible radiation, infrared radiation, electron beam radiation, or combinations thereof.

8. The method of claim 1, further comprising the step of curing wherein curing is done by chemical curing or thermal curing.

9. The method of claim 5, wherein the thermal curing is carried out at about 300° C. or above.

10. A method for manufacturing a three-dimensional article, the method comprising:
    a. depositing a composition comprising:
       a homogeneous mixture of a first high performance polymer (HPP) dissolved in a solvent;
       wherein the composition further comprises particles of a second HPP that are dispersed in the homogeneous mixture of the first HPP and the solvent; and
       wherein the particles of the second HPP are insoluble in the homogeneous mixture;
       into a mold to form the three-dimensional article; and
    b. removing the three-dimensional article from the mold.

11. The method of claim 10, wherein the first HPP comprises a polyketone.

12. The method of claim 10, wherein the second HPP comprises polyimides, polyketones, reduced forms of polyketones, and polyethersulfones, and wherein the second HPP is not soluble in the solvent.

13. The method of claim 10, further comprising the step of curing wherein curing is done by chemical curing or thermal curing.

14. The method of claim 13, wherein the thermal curing is carried out at a temperature below the glass transition temperature of the first HPP.

15. The method of claim 13, wherein the thermal curing is carried out at a temperature above the glass transition temperature of the first HPP.

* * * * *